(12) United States Patent
Fujimoto

(10) Patent No.: US 6,467,347 B1
(45) Date of Patent: Oct. 22, 2002

(54) ANGULAR VELOCITY DETECTION CIRCUIT, METHOD OF DETECTING ANGULAR VELOCITY AND VIBRATING GYROSCOPE

(75) Inventor: Katsumi Fujimoto, Toyama-ken (JP)

(73) Assignee: Murata Manufacturing Co., Ltd. (JP)

( * ) Notice: Subject to any disclaimer, the term of this patent is extended or adjusted under 35 U.S.C. 154(b) by 85 days.

(21) Appl. No.: 09/692,644

(22) Filed: Oct. 19, 2000

(30) Foreign Application Priority Data

Oct. 20, 1999 (JP) .......................................... 11-298275

(51) Int. Cl.⁷ ................................................. G01P 9/04
(52) U.S. Cl. .................................................. 73/504.12
(58) Field of Search ........................ 73/504.04, 504.12, 73/504.13, 504.14, 504.15, 504.16; 310/316, 317, 321

(56) References Cited

U.S. PATENT DOCUMENTS

| | | | | | |
|---|---|---|---|---|---|
| 5,520,050 A | * | 5/1996 | Nakamura | ................ | 73/504.12 |
| 5,551,292 A | * | 9/1996 | Terajima et al. | ......... | 73/504.12 |
| 5,794,080 A | * | 8/1998 | Watanabe et al. | ........ | 73/504.12 |
| 5,902,931 A | * | 5/1999 | Mori et al. | ............... | 73/504.12 |

FOREIGN PATENT DOCUMENTS

| | | | |
|---|---|---|---|
| JP | 62150116 | | 7/1987 |
| JP | 613970 | | 2/1994 |
| JP | 6-147901 | * | 5/1994 |
| JP | 7260493 | | 10/1995 |
| JP | 8146056 | | 6/1996 |

* cited by examiner

*Primary Examiner*—Helen Kwok
(74) *Attorney, Agent, or Firm*—Ostrolenk, Faber, Gerb & Soffen, LLP

(57) ABSTRACT

A method of detecting an angular velocity including generating a differential signal from a vibrator, the differential signal having a Coriolis force proportional to angular velocity if the vibrator is rotated; generating a timing signal based on the differential signal; and applying the differential signal to a voltage-time converter which, based on the timing signal, converts the differential signal to a pulse train having a duty cycle proportional to the angular velocity. The method is implemented in an angular velocity detector, such as a gyroscope.

32 Claims, 11 Drawing Sheets

ANGULAR VELOCITY DETECTION CIRCUIT, METHOD OF DETECTING ANGULAR VELOCITY AND VIBRATING GYROSCOPE

BACKGROUND OF THE INVENTION

1. Field of the Invention

The present invention relates to an angular velocity detection circuit in a vibrating gyroscope, for example, an angular velocity detection circuit in a vibrating gyroscope for detecting an angular velocity based on an oscillation output of a vibrating gyroscope including a bimorph vibrator for use in correction of camera-shake, a navigation system, and so forth, and to a method of detecting angular velocity.

2. Description of the Related Art

FIG. 11 is a schematic perspective view showing an example of a conventional bimorph vibrator for use in a vibrating gyroscope. In FIG. 11, the bimorph vibrator 1 is formed by two piezoelectric element sheets having polarization directions which are opposite to each other (as shown by the oppositely facing arrows), and which are bonded to each such that the vibrator 1 has a rectangular cross-section. When the vibrator 1 vibrates in the longitudinal mode, i.e., vibrates in the X-axis direction, and the vibrator is rotated at an angle ($\Omega$) about the Z-axis direction, vibration is generated in the transverse vibrating mode, i.e., in the vertical Y-axis direction, due to the Coriolis force.

The amplitude of this vibration is proportional to the angular velocity. Thus, the angular velocity can be detected by utilizing the proportional relation. The vibrator 1 is provided with right and left electrodes 1R and 1L, respectively, and a common electrode (not shown). A differential output signal of a left signal and a right signal is output from the right and left electrodes 1L and 1R, respectively. For the above described vibrator 1, it is necessary to adjust the balance, the null voltage (also called an offset voltage or a neutral point voltage), the sensitivity, and so forth, individually.

FIG. 12 is a block diagram of an angular velocity detection circuit for producing an output from the vibrator 1 shown in FIG. 11. In FIG. 12, the differential output signal from the vibrator 1 is amplified in a differential amplification circuit 21. The amplified waveform is detected in a synchronous detection circuit 22 and smoothed in a smoothing circuit 23. The produced DC voltage is DC amplified in a DC amplifier 24. When the signal is amplified in the DC amplifier 24, the null voltage is also DC amplified. Accordingly, the DC component is cut off in a DC cut circuit 25 comprising, e.g., a filter. The signal is further amplified in an amplification circuit 26 to be output as an analog signal. Then, the analog signal is converted to a digital signal in an A/D converter 27. Thereafter, the angular velocity detection signal is supplied to a microcomputer 28, so that camera-vibrating shake is suppressed, or control for navigation is carried out.

Generally, a conventional gyroscope chip includes the vibrator 1 through the amplifier 26. As a result, the conventional vibrating gyroscope chip tends to become large in size. In addition, it is necessary for an apparatus installed with a vibrating gyroscope to employ an A/D converter. There is a great demand for a vibrating gyroscope which can output a digital signal corresponding to a detected angular velocity, thereby enabling cost reduction of the vibrating gyroscope, as well as cost reduction of the entire the apparatus installed within the vibrating gyroscope.

The conventional gyroscopes have additional drawbacks. Specifically, when a signal component is amplified in the DC amplifier 24 in the angular velocity detection circuit shown in FIG. 12, the null voltage is also amplified. If the gain of the DC amplifier is high, the fluctuation of the null voltage in response to the change in temperature become so large to affect the detection of a signal representing the angular velocity. For this reason, the gain of the DC amplifier 24 cannot too large.

Furthermore, the null voltage cannot become 0V due to the unbalance between the right signal and the left signal. As a result, the gain of the DC amplifier 24 has to be so small that the null voltage does not saturate at power voltage or the ground potential, regardless of the fluctuation of the null voltage.

In addition, if a high pass filter for passing a signal having a frequency of at least 0.1 Hz is formed to cut the DC component in the DC cut circuit 25, it is necessary to provide a combination of a 20 $\mu$F large capacitance capacitor and a 1 M$\Omega$ resistor for the high pass filter. Thus, a large-sized apparatus is required.

Furthermore, in the circuit shown in FIG. 12, the output signal is output from the differential amplification circuit 21 with the right and left signal components being out of phase in some cases, and with the amplitudes of the right and left signal components being shifted, in other cases. In the case in which the amplitudes are shifted from each other, the amplitude of the differential output is simply changed, since the right and left signal components are sine waves. On the other hand, when the right and left signal components are out of phase, the output signal is out of phase with the reference signal.

As another conventional example, Japanese Examined Patent Application Publication No. 6-13970 describes that a drive signal is applied to the detection sideface of a vibrator in such a manner that the phase difference angle between the vector of an output voltage, caused by the angular velocity when a vibrator is rotated, and the vector of the null voltage when the vibrator stops, becomes 90°. The angular velocity is detected based on a phase difference in the combined vector.

In this example, the amplitude of the output from the vibrator has a linearity. On the other hand, the relation between the phase difference and the sensitivity is not linear, and the non-linearity tends to change in accordance with the null phase. For this reason, it is desirable to digitize the amplitude of the Coriolis force.

For example, Japanese Unexamined Patent Application Publication No. 62-150116 describes that sample-and-hold is carried out at the time when the angular velocity, caused by oscillation-driving, becomes maximum and minimum.

Furthermore, in Japanese Unexamined Patent Application Publication No. 7-260493, it is described that a difference in current passing through a piezoelectric device is detected, and sample-hold is carried out at the timing when the displacement velocity of a vibrator detecting the difference becomes zero. However, it is not described how the sample-and-held signal is digitized.

Japanese Unexamined Patent Application Publication No. 8-146056 discloses a phase difference detection circuit for a gyroscope. Although the circuit outputs signals which can be directly processed by a microcomputer, the phase difference of the detected signal is adversely affected by the change of the temperature. That is, the phase difference detection circuit has a problem that it is difficult to detect an angular velocity precisely and stably.

SUMMARY OF THE INVENTION

Accordingly, it is a main object of the present invention to provide an angular velocity detection circuit for a vibrating gyroscope which can output a digital signal corresponding to a detected angular velocity. Another object of the present invention is to provide an angular velocity detection circuit for a vibrating gyroscope in which a null voltage can be detected and corrected.

The present invention also provides a vibrating gyroscope comprising such an angular velocity detection circuit and a method of detecting an angular velocity.

In accordance with a first aspect of the invention, a method of detecting angular velocity comprises generating a differential signal from a vibrator, the differential signal having a Coriolis force proportional to angular velocity if the vibrator is rotated; generating a timing signal based on the differential signal; and applying the differential signal to a voltage-time converter which, based on the timing signal, converts the differential signal to a pulse train having a duty cycle proportional to the angular velocity.

In accordance with another aspect, the invention is directed to an angular velocity detector, which comprises a vibrator for generating a differential signal, the differential signal having a Coriolis force proportional to angular velocity if the vibrator is rotated and having a null value; a differential circuit for detecting the differential signal; a timing circuit for generating a timing signal based on the differential signal detected by the differential circuit; and a voltage-time converter for receiving the differential signal detected by the differential signal detected by the differential circuit which, based on the timing signal, converts the differential signal to a pulse train having a duty cycle proportional to the angular velocity.

According to still another aspect of the present invention, the differential signal is derived from first and second outputs of the vibrator and the angular velocity is detected by generating a reference signal from a sum of the first and second output signals, generating a timing signal based on the reference signal and sample-and-holding the differential signal based on a timing signal to generate a sample-hold signal. The differential signal includes a component due to Coriolis force. The sample-hold signal is then integrated and compared with a predetermined level to generate a digital signal having a duty cycle proportional to the angular velocity. The angular velocity is then determined based on the duty cycle.

The invention, according to a further aspect, provides an angular velocity detector, which comprises a vibrator for generating a differential signal from first and second outputs of the vibrator, the differential signal having a Coriolis force proportional to angular velocity if the vibrator is rotated and having a null value; a differential circuit for detecting the differential signal; a reference signal generator for generating a reference signal from the sum of the first and second outputs of the vibrator; a timer for generating a timing signal based on the reference signal; a sample-and-hold circuit for sampling-and-holding the differential signal detected by the differential circuit based on the timing signal to generate a sample-and-hold signal; an integrator for integrating the sample-and-hold signal; a comparator for comparing the integrated sample-and-hold signal with a predetermined level to generate a digital signal having a duty cycle proportional to the angular velocity; and means for determining the angular velocity from the duty cycle of the digital signal.

According to still another aspect of the invention, the predetermined level is such that when there is no Coriolis force the duty cycle is zero.

According to still another aspect, the invention provides an angular velocity detection circuit, which comprises a differential circuit for generating a differential signal, the differential signal having a Coriolis force proportional to angular velocity; a timing circuit for generating a timing signal based on the differential signal detected by the differential circuit; and a voltage-time converter for receiving the differential signal detected by the differential signal detected by the differential circuit and which, based on the timing signal, converts the differential signal to a pulse train having a duty cycle proportional to the angular velocity.

According to a further aspect, the invention provides an angular velocity detecting circuit, which comprises a differential circuit for generating a differential signal from first and second input signals, the differential signal having a Coriolis force proportional to angular velocity and having a null value; a reference signal generator for generating a reference signal from the first and second input signals; a timer for generating a timing signal based on the reference signal; a sample-and-hold circuit for sampling-and-holding the differential signal detected by the differential circuit at times based on the timing signal to generate a sample-and-hold signal; an integrator for integrating the sample-and-hold signal; a comparator for comparing the integrated sample-and-hold signal with a predetermined level to generate a digital signal having a duty cycle proportional to the angular velocity; and means for determining the angular velocity from the duty cycle of the digital signal.

In accordance with yet another aspect of the present invention, the time range of integration is extended to increase resolution level.

According to the invention, duplicated circuits for digitizing synchronous detection or the like, employed conventionally, can be eliminated. Thus, cost-saving can be realized.

Moreover, the circuit configuration of the V-T conversion means can be simplified preferably by using a sample-and-hold circuit which provides a linear decreasing output over time.

Furthermore, control can be carried out so that the null voltage is zero at any time, and effects of changes in temperature on the null voltage can be canceled preferably by comparing the sample-and-hold values at a particular phase point in a first sampling period and at a phase point different from the above phase point in another sampling period to estimate the null differential voltage, and controlling the level of the comparison means, based on the estimated null differential voltage.

For the purpose of illustrating the invention, there is shown in the drawings several forms which are presently preferred, it being understood, however, that the invention is not limited to the precise arrangements and instrumentalities shown Other features and advantages of the present invention will become apparent from the following description of the invention which refers to the accompanying drawings.

BRIEF DESCRIPTION OF THE DRAWING(S)

Figure 1:
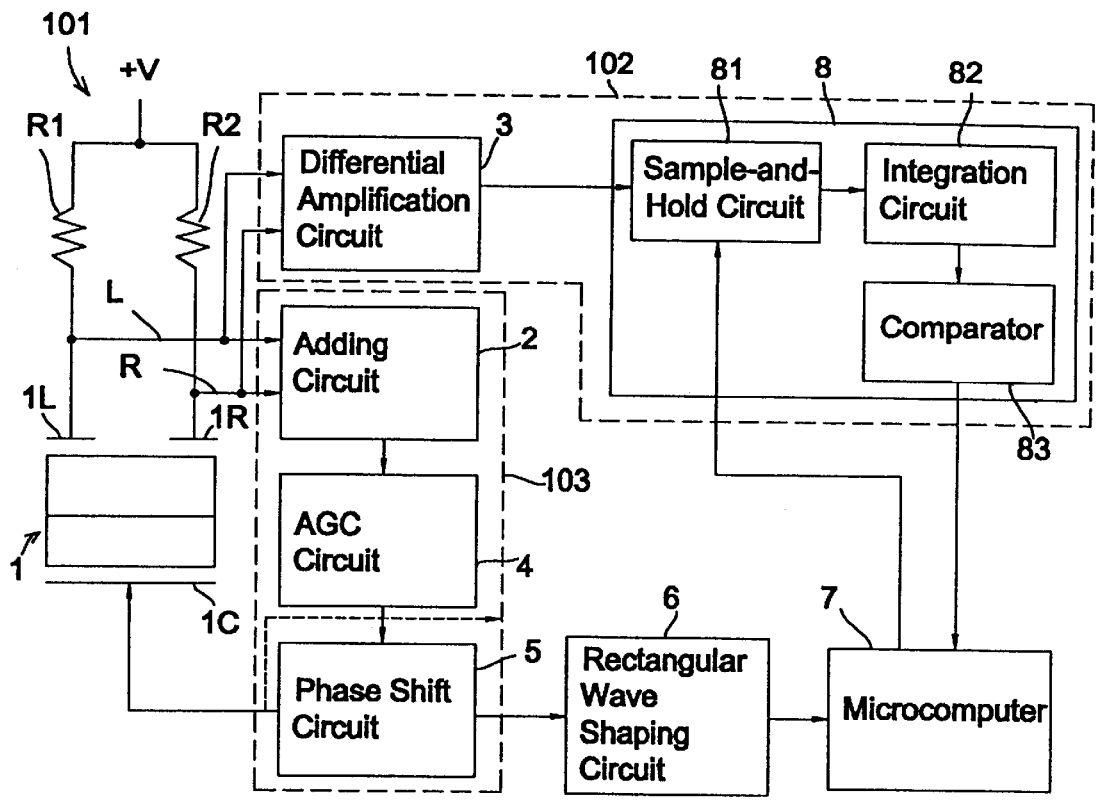
FIG. 1 is a block diagram of an angular velocity detection circuit according to an embodiment of the present invention.
Figure 3:
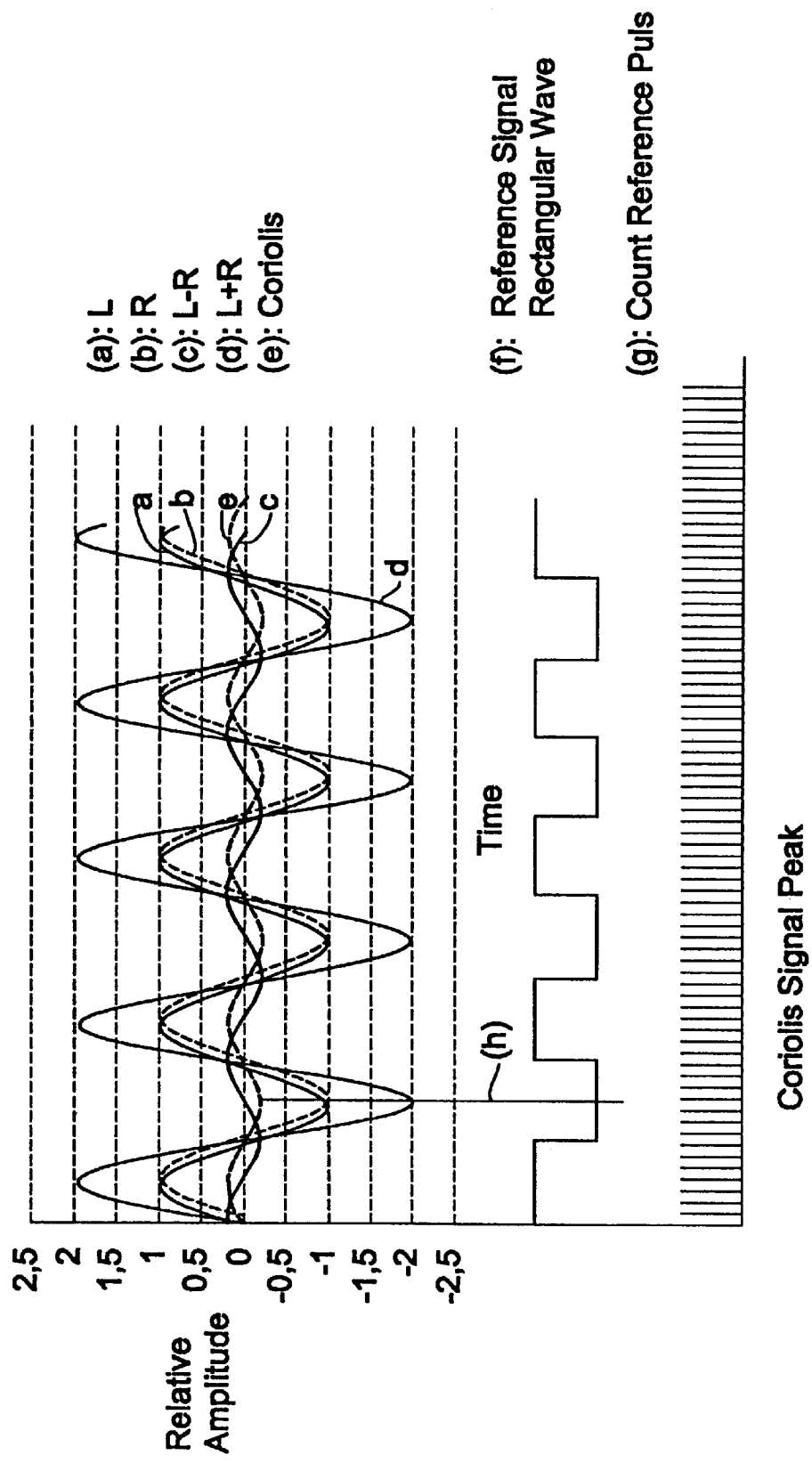

FIG. 3 consists of waveform charts obtained at the respective parts of the angular velocity detection circuit shown in FIG. 1.

Figure 4:
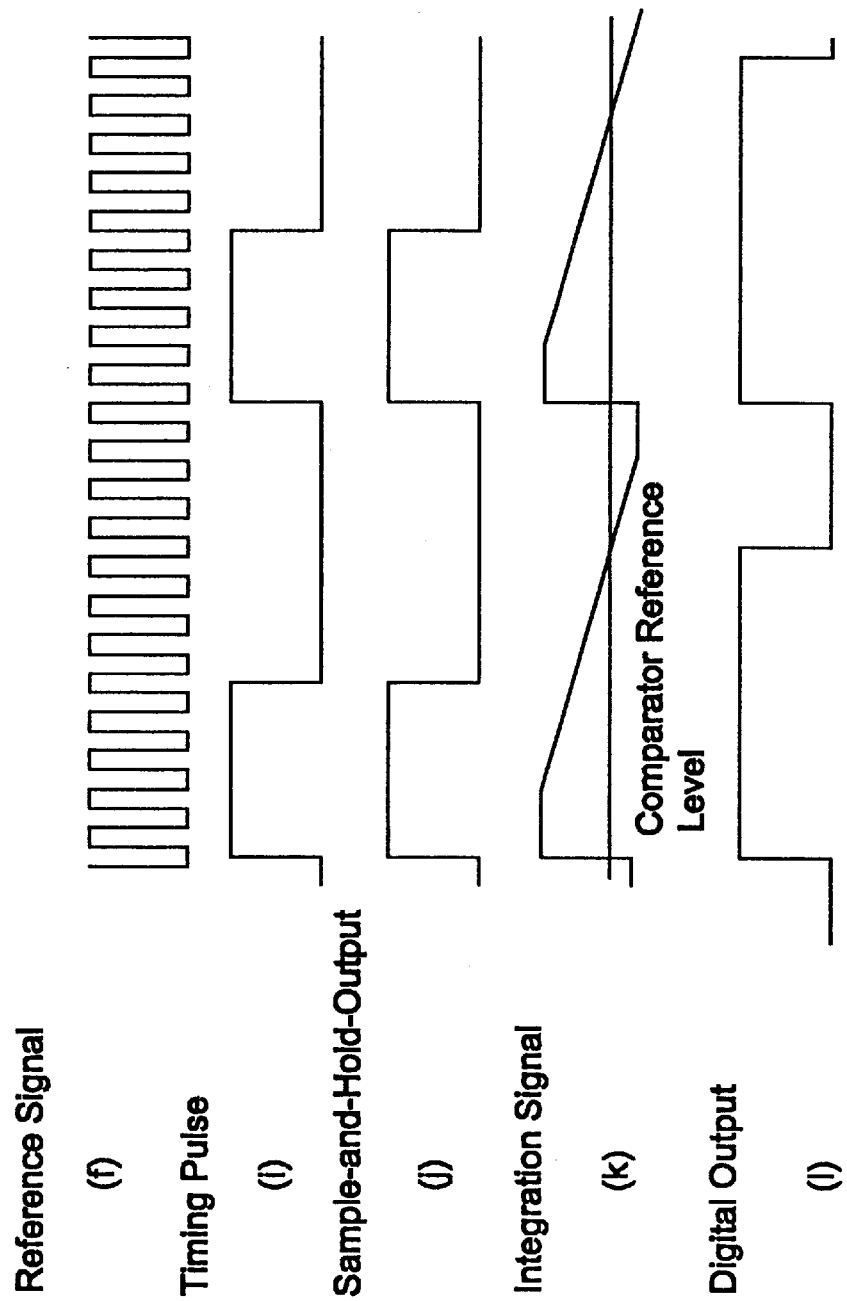

FIG. 4 consists of waveform charts obtained at the respective parts of the angular velocity detection circuit shown in FIG. 1.

Figure 5:
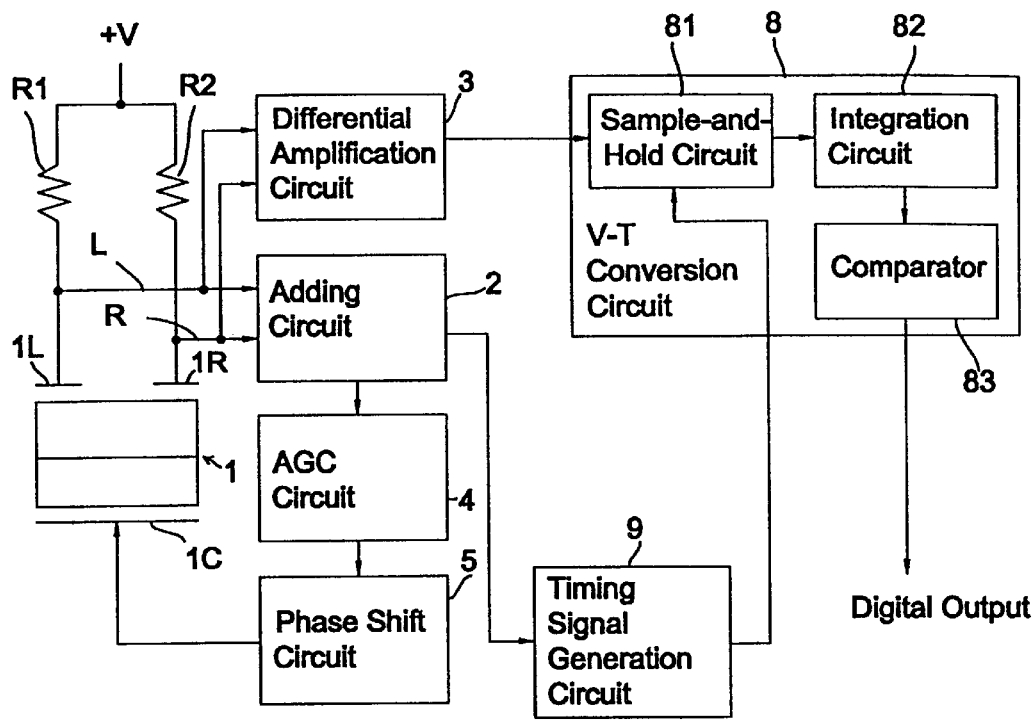

FIG. 5 is a block diagram showing an angular velocity detection circuit according to another embodiment of the present invention.

Figure 6:
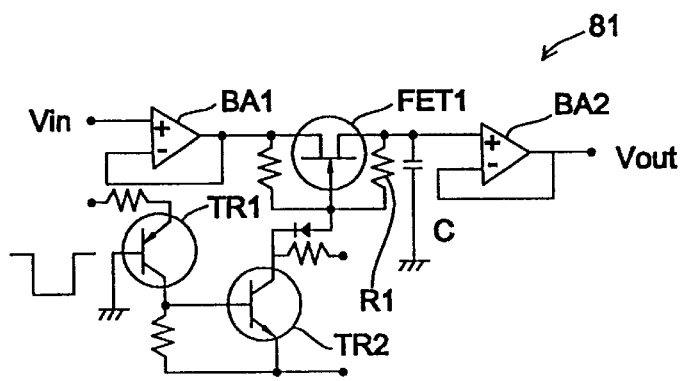

FIG. 6 is a diagram of a sample-and-hold circuit used in yet another embodiment of the present invention.

Figure 7:
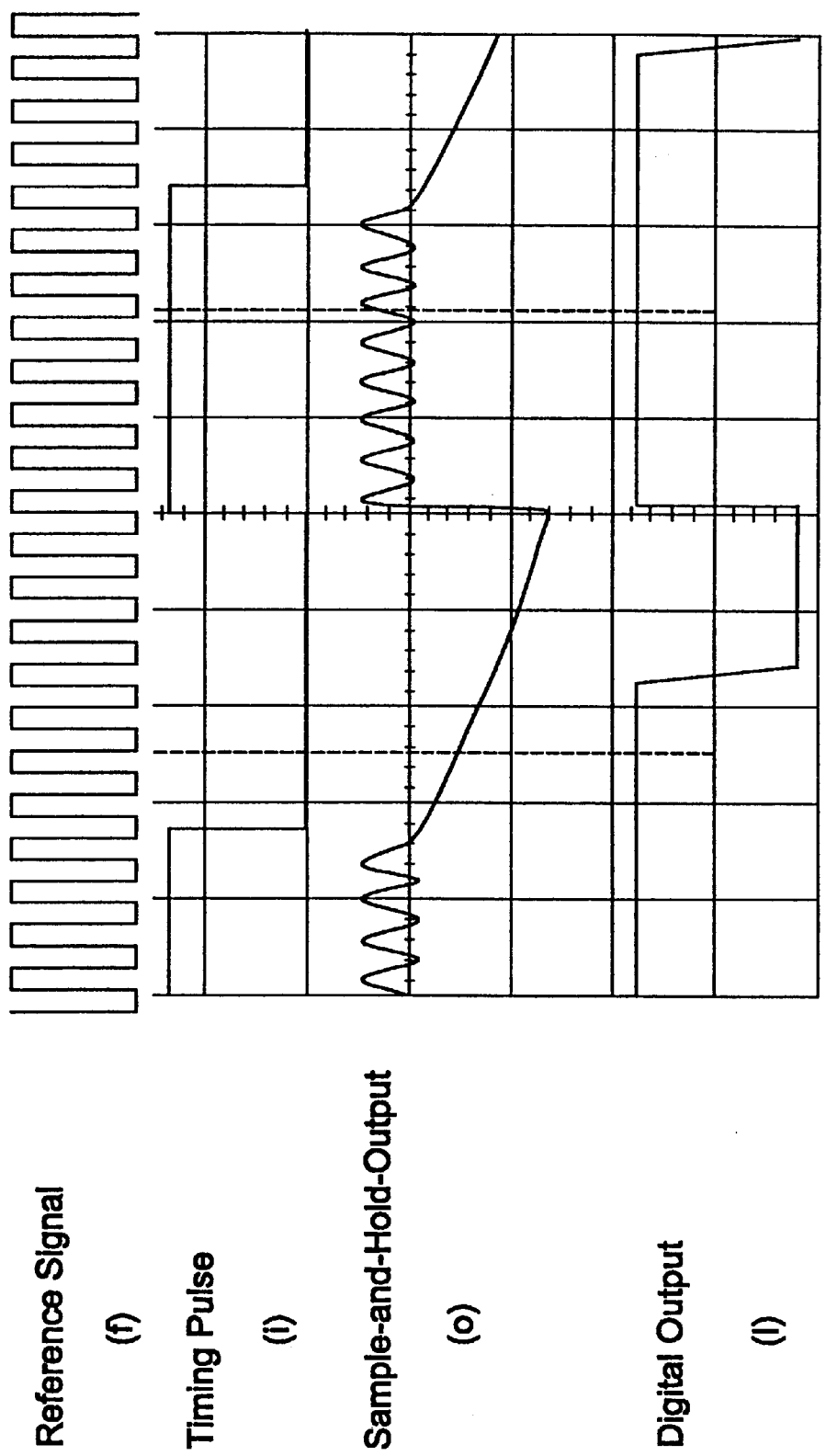

FIG. 7 consists of waveform charts illustrating the operation of the sample-and-hold circuit shown in FIG. 6.

Figure 8:
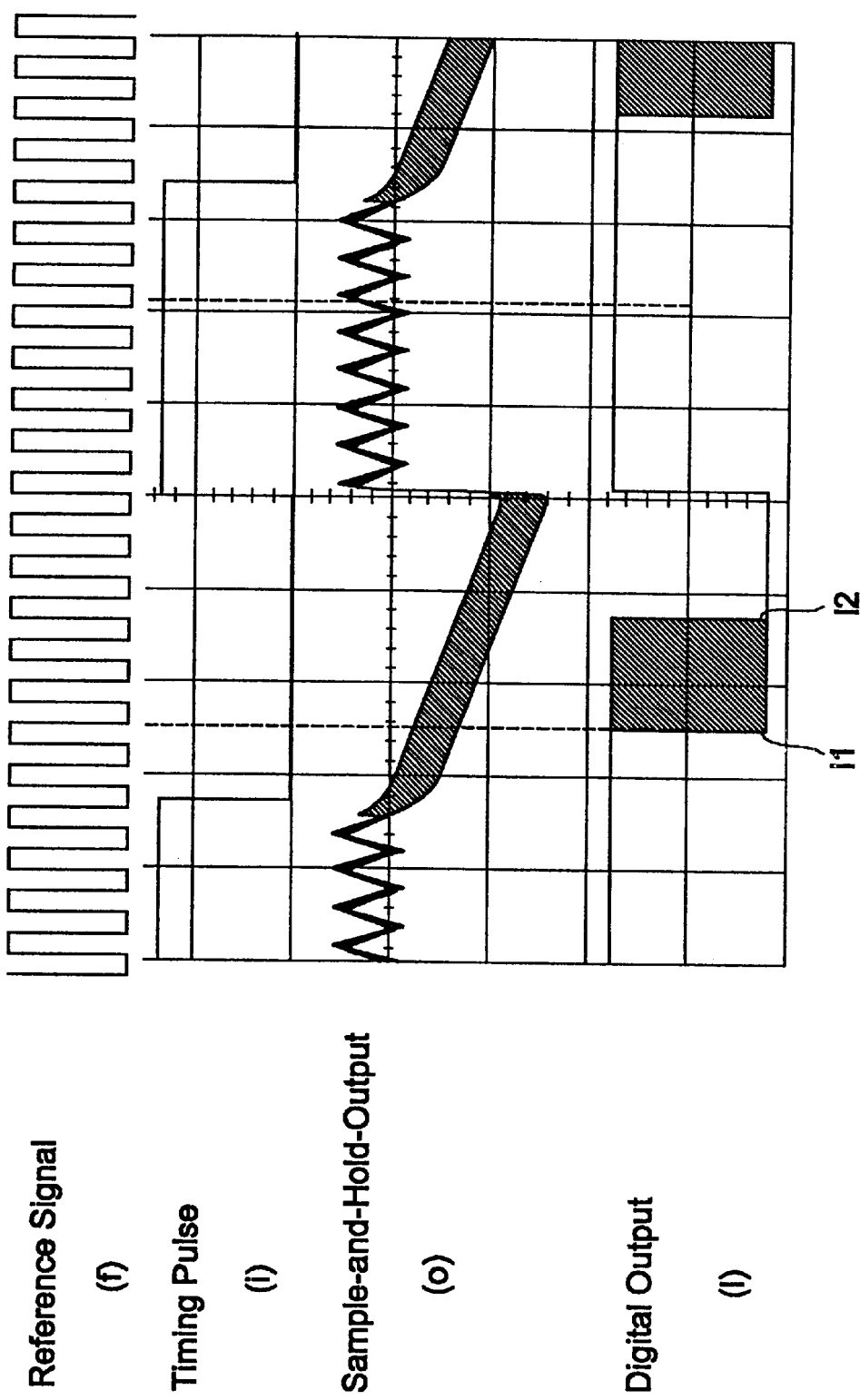

FIG. 8 consists of waveform charts illustrating the operation of the sample-and-hold circuit shown in FIG. 6.

Figure 9A:
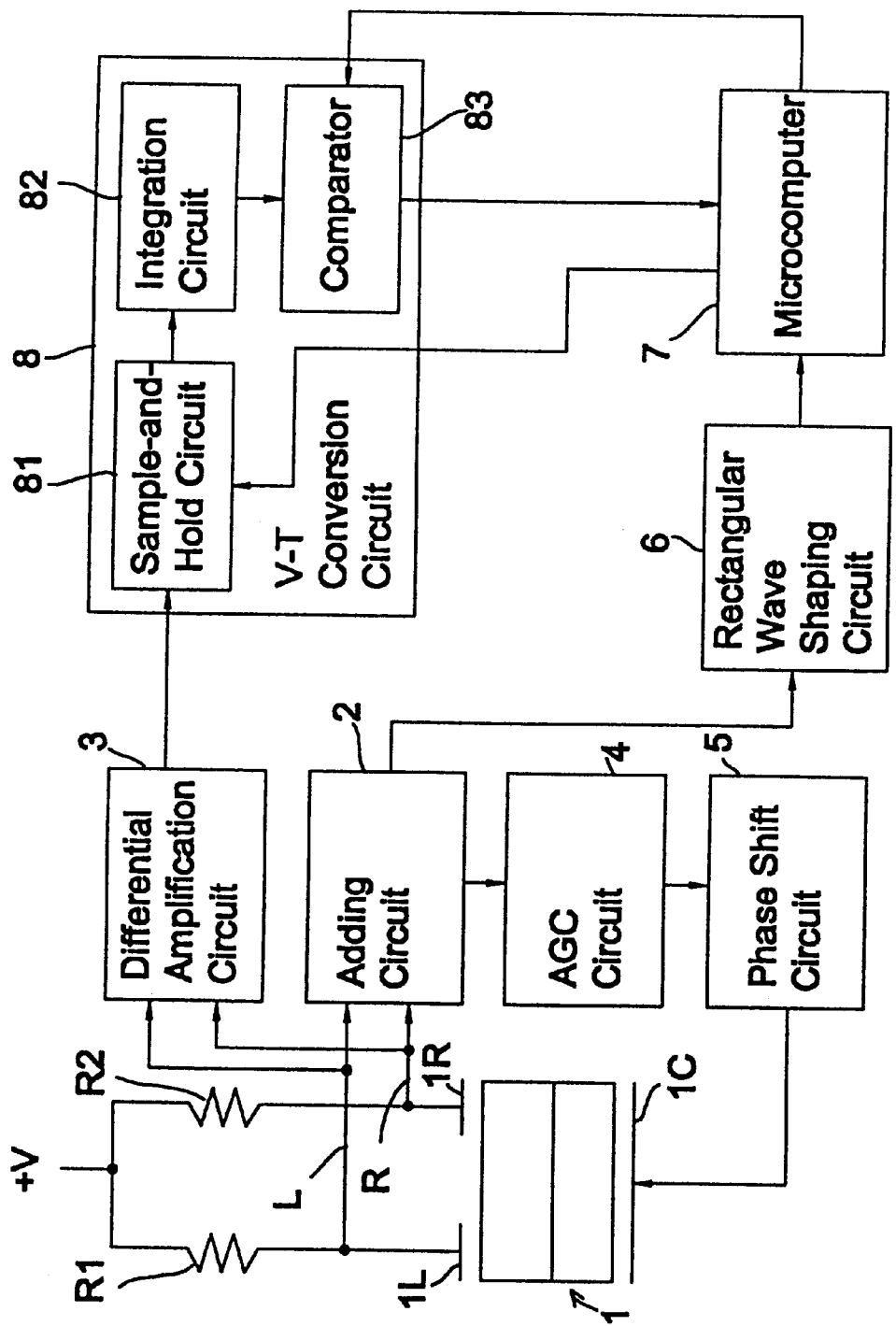

FIG. 9A is a block diagram showing an angular velocity detection circuit according to another embodiment of the present invention.

Figure 9B:
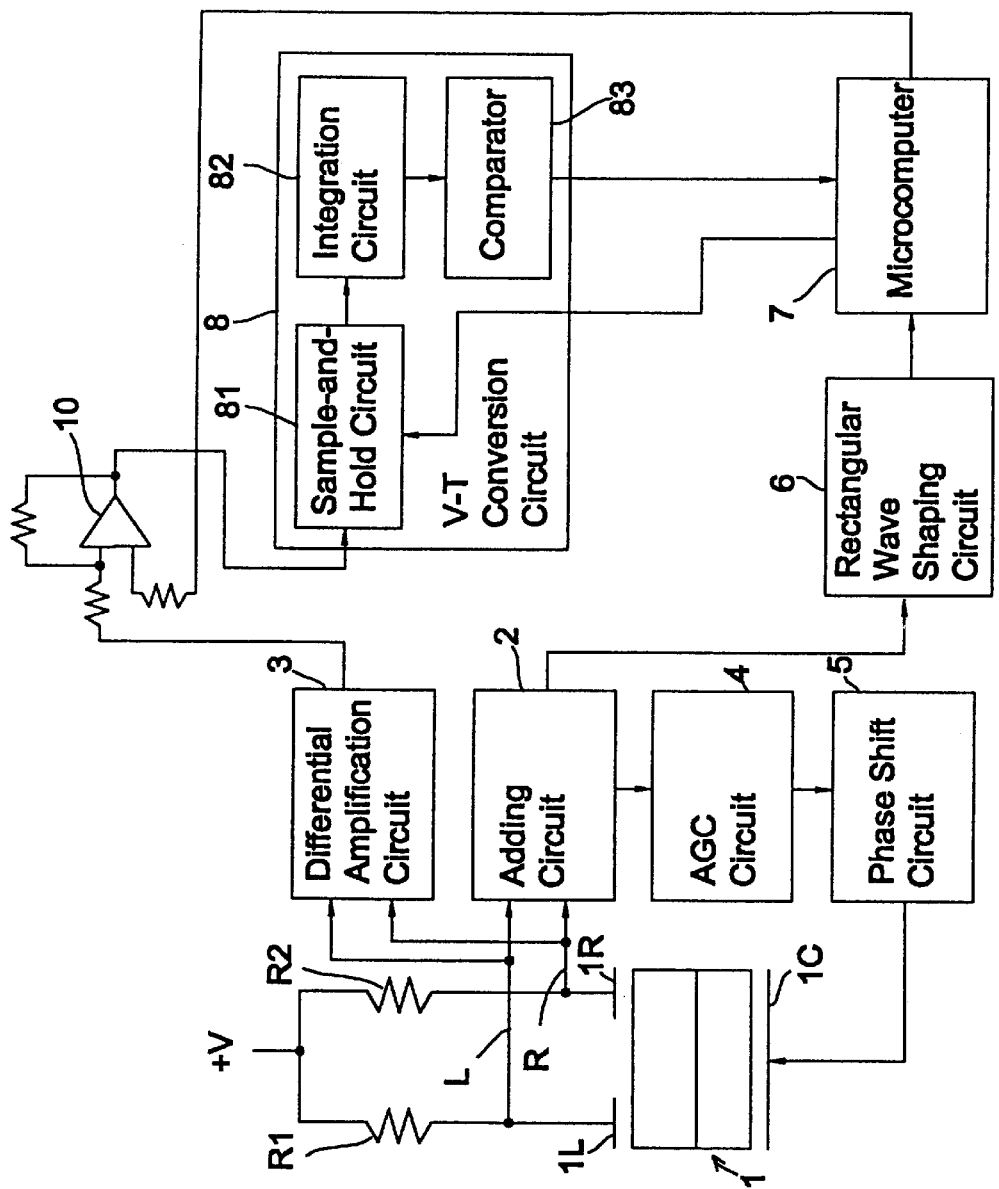

FIG. 9B is a block diagram showing an angular velocity detection circuit according to a variation of the embodiment shown in FIG. 9A.

Figure 10:
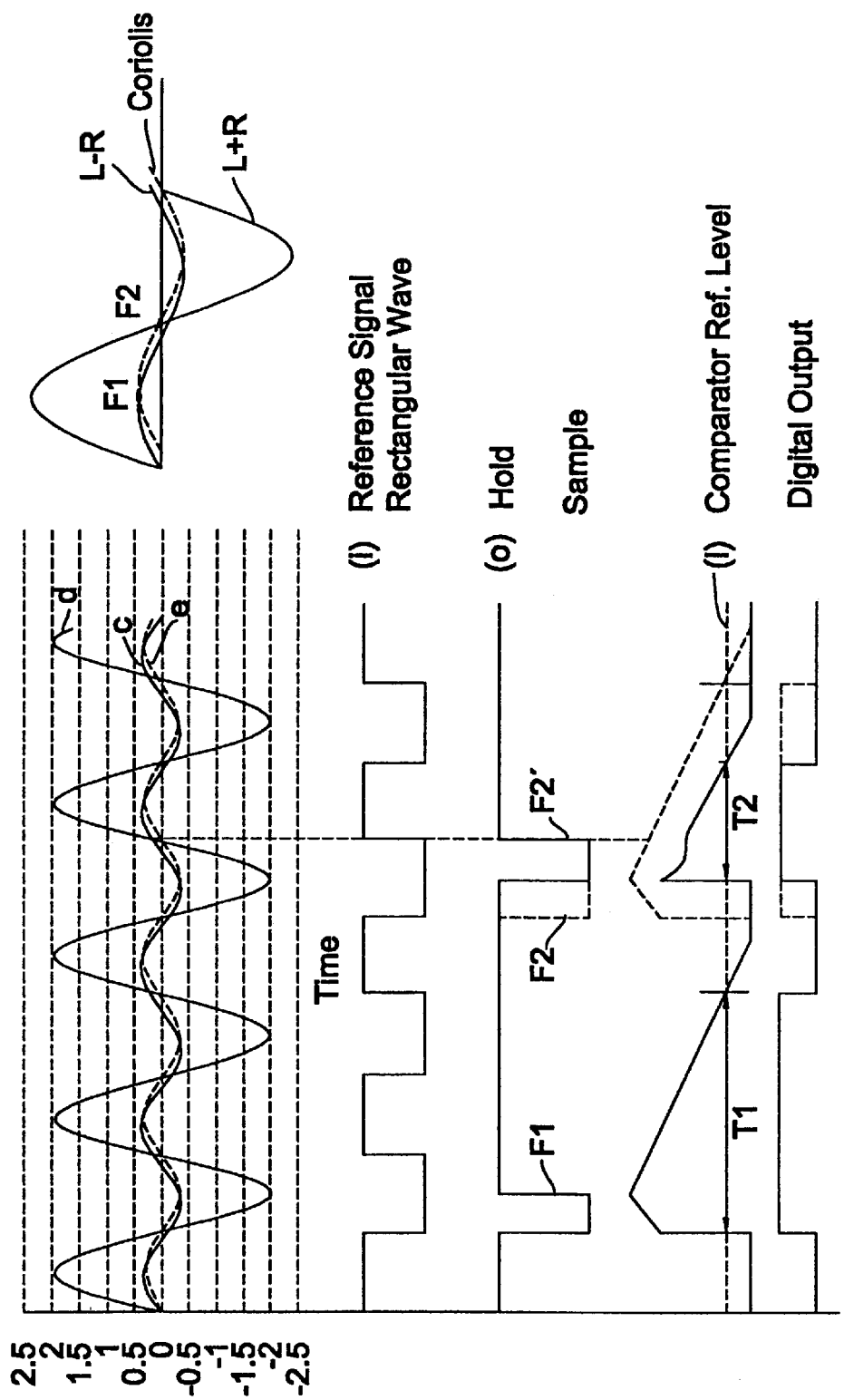

FIG. 10 consists of waveform charts illustrating the operation of the embodiment shown in FIG. 9.

Figure 11:
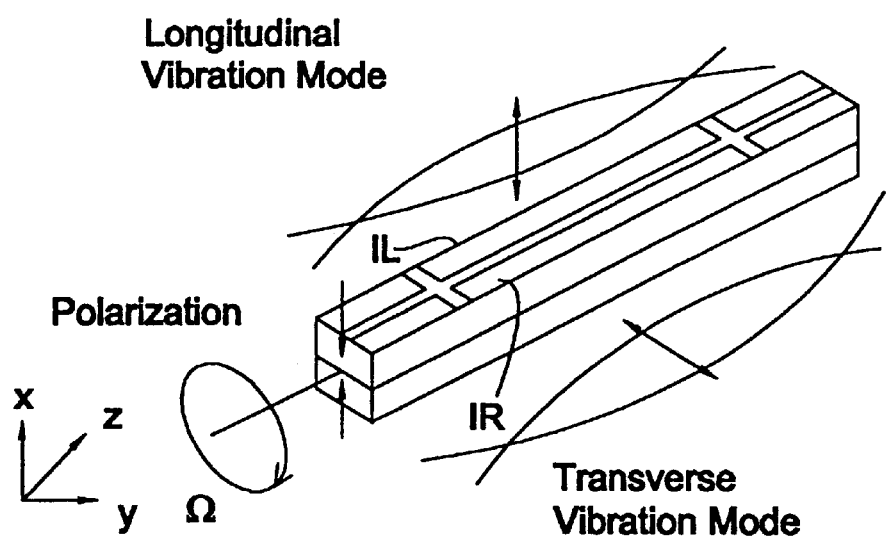

FIG. 11 is a perspective view showing the appearance of a bimorph vibrator which constitutes the background of the present invention and to which the present invention is applied.

Figure 12:
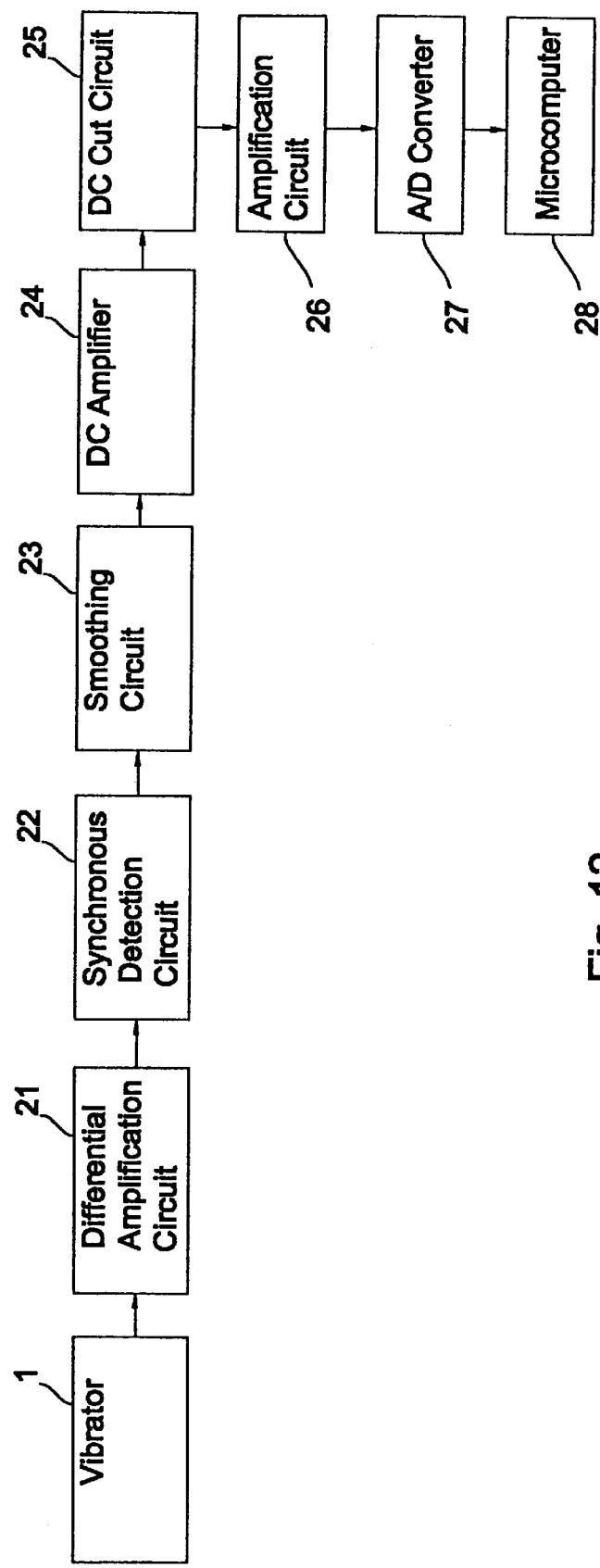

FIG. 12 is a block diagram of a conventional angular velocity detection circuit.

DETAILED DESCRIPTION OF PREFERRED EMBODIMENTS

Hereinafter, the preferred embodiments of the present invention are explained in detail with reference to the drawings.

FIG. 1 is a block diagram of a vibrating gyroscope 101 with a microcomputer 7. The vibrating gyroscope 101 comprises a vibrator 1, an angular velocity detection circuit 102 and a driving circuit 103.

The vibrator 1 is provided with a left electrode 1L, a right electrode 1R, and a common electrode 1C. A voltage V is applied to the left electrode 1L and the right electrode 1R via resistors R1 and R2, respectively. L and R signals, each including a signal component corresponding to the Coriolis force (hereinafter, referred to as a Coriolis signal component) in the case where a rotational angular velocity is applied to the vibrator 1, are output from the right and left electrodes 1R and 1L, and supplied to an adding circuit 2 and a differential amplification circuit 3, respectively. The L and R signals also include a sine signal component corresponding to the vibration of the vibrator 1 and having substantially the same phase. The Coriolis signal components in the L signal and R signal have the opposite phase. The adding circuit 2 adds the L signal and the R signal, and outputs an L+R signal. The Coriolis forces cancel each other out by the addition of the L and R signals in the adding circuit 2, so that the output signal from the adding circuit 2 becomes a stable reference signal.

The above-described reference signal is supplied as a reference signal to an AGC circuit 4, so that AGC circuit 4 outputs a drive voltage having a constant level. The drive voltage is supplied to the common electrode 1C of the vibrator 1 via a phase shift circuit 5. The phase shift circuit 5 adjusts the phase of the output from the adding circuit 5, and in particular, adjusts the phase difference between the output from the adding circuit 2 and the drive voltage supplied to the common electrode 1C so that the vibrator 1 is oscillated at a desired frequency with high stability. In this embodiment, the phase difference is substantially zero. The vibrator 1, the adding circuit 2, the AGC circuit 4, and the phase shift circuit 5 constitute the driving circuit 103.

The reference signal which is the output signal from the adding circuit 2 is also supplied to a rectangular wave shaping circuit 6, in which a rectangular wave is formed, and is supplied to a microcomputer 7 as a timing-sampling signal. The drive voltage which is the output signal from the phase shift circuit 5, may be supplied to the rectangular wave shaping circuit 6 as indicated by the dotted line in FIG. 1.

The microcomputer 7 discriminates the leading edge or the trailing edge of the timing-sampling signal, and counts the time ranging from the leading edge of the timing-sampling signal to the trailing edge thereof by use of reference pulses. The microcomputer 7 determines the frequency based on the count. Accordingly, the microcomputer 7 can easily determine what relation the frequency and the phase of the reference signal, which is the output from the adding circuit 2, have. Furthermore, the microcomputer 7 outputs a timing pulse for sample-and-hold to a voltage-to-time conversion type A-D converter (referred to as V-T conversion circuit) 8, based on the timing-sampling signal.

The differential amplification circuit 3 to which the L and R signals output from the vibrator 1 are supplied outputs a differential signal to the V-T conversion circuit 8. The V-T conversion circuit 8 converts a voltage change ΔE into a large time-range ΔT.

The V-T conversion circuit 8 includes a sample-and-hold circuit 81, an integration circuit 82, and a comparator 83. The sample-and-hold circuit 81, based on a timing pulse from the microcomputer 7, samples and holds the differential signal from the differential amplification circuit 8 and supplies it to the integration circuit 82. The integration circuit 82 integrates the sample-and-held signal and outputs it to the comparator 83. The comparator 83 compares the integrated output with a predetermined level and outputs the digital signal to the microcomputer 7.

Next, the signal output from the vibrator 1 will be described with reference to FIG. 3. The difference between the L signal (a) and the R signal (b) is shown at L−R (c). The sum between them is shown at L+R (d).

As explained above, each of the L signal (a) and the R signal (b) includes the signal component corresponding to the vibration of the vibrator 1 and the Coriolis signal component. Needless to say, the Coriolis signal component appears only when the angular velocity is applied to the vibrator 1. The signal components corresponding to the vibration of the vibrator 1 in the L signal (a) and the R signal (b) respectively have the same amplitude and phase if the vibrator 1 is ideally symmetric. However, an actual vibrator 1 is generally imperfect, and the signal components corresponding to the vibration of the vibrator 1 in the L signal (a) and the R signal (b), respectively, are slightly different in amplitude and phase.

As the Coriolis signal components in the L signal (a) and the R signal (b) have the opposite phase, the Coriolis signal components are canceled in the L+R signal (d), whereby the L+R signal (d) has about twice the amplitude as that of either the L or the R signal component.

On the other hand, the L−R signal (c) includes the Coriolis signal component which is a sum of the Coriolis signal components in the L and R signals and a null differential voltage. The null differential voltage is a difference between the signal components corresponding to the vibration of the vibrator 1 in the L signal (a) and the R signal (b), and is zero in the ideal case. It is to be noted that the null differential voltage fluctuates in accordance with the change in the ambient temperature which surrounds the vibrating gyroscope.

The Coriolis signal cannot be separated from the null differential voltage due to its nature, but it is known that the Coriolis signal (e) has substantially the same phase as the L+R signal (d).

As described above, the L+R signal (d) output from the adding circuit 2 is used as a reference signal and input to the phase shift circuit 5 to drive the vibrator 1. The L+R signal (d) is also input to the rectangular wave shaping circuit 6 to provide the microcomputer 7 with a reference signal rectangular wave.

The reference signal can be arbitrarily adjusted in the phase shift circuit 5. As the reference signal, the L signal (a) or the R signal (b) as shown in FIG. 3 may be solely used, provided that the phase and the frequency are stable. However, the Coriolis force is superposed on the L signal or the R signal. Therefore, when each signal is shaped in a rectangular wave, it may become in or out of phase with the "differential", or duty cycle may be varied. Thus, the sole use of the L signal (a) or the R signal (b) is not preferable.

The microcomputer 7 detects the leading edges and the trailing edges of the reference signal rectangular wave (f) and calculates the count of one period of the reference signal by use of reference clock signals (g) generated in the microcomputer 7 or by clock signals similar to the above reference clock signals. A vertical line (h) shows timing at which a timing pulse is output for sampling and holding the L−R signal (c). the sample-and-hold is carried out at the highest peak points of the Coriolis signal (e), since it is most efficient. However, the sample-and-hold doesn't have to be carried out at the highest points, and may be conducted in the vicinities of the highest points.

The L−R signal output form the differential amplification circuit 3 is supplied to the V-T conversion circuit 8. The L−R signal is sampled and held in the sample-and-hold circuit 81. FIG. 4 shows various signals related to the sample-and-hold circuit 81. It is to be noted that the reference signal rectangular wave (f) in shown with a smaller pulse width in FIG. 4. The sample-and-hold circuit 81, samples and holds the L−R signal based on a timing pulse (i) The sample-and-hold voltage depends on the amount of the Coriolis signal, i.e., the angular velocity, and is integrated in the integration circuit 82 as shown in an integrated signal (k). The signal wave from of the integrated signal (k) is inclined linearly decreasing with the lapse of time. Based on the next timing pulse, the L−R signal is sample-and-held again.

The integrated signal (k), which is the output from the integration circuit 82, is supplied to the comparator 83 and the integrated signal (k) is compared with a predetermined reference signal. The comparator 83 outputs a high level during a time period in which the integrated signal (k) is higher than the predetermined reference signal, thereby outputting a variable duty-ratio signal as a digital signal (1) corresponding to an angular velocity detection signal to the microcomputer 7. The microcomputer 7 finally counts the digital signal by use of a reference clock to calculate the angular velocity. .

It is noted that the reference signal used in the comparator 83 is set at a predetermined level so that the digital signal (1) has a duty ratio of 50% in the case where no Coriolis force is applied, (i.e., the digital signal which indicates that the angular velocity is zero). By this operation, the digital signal (1) can exclude the affects of the null differential voltage and represents the correct angular velocity.

Figure 2:
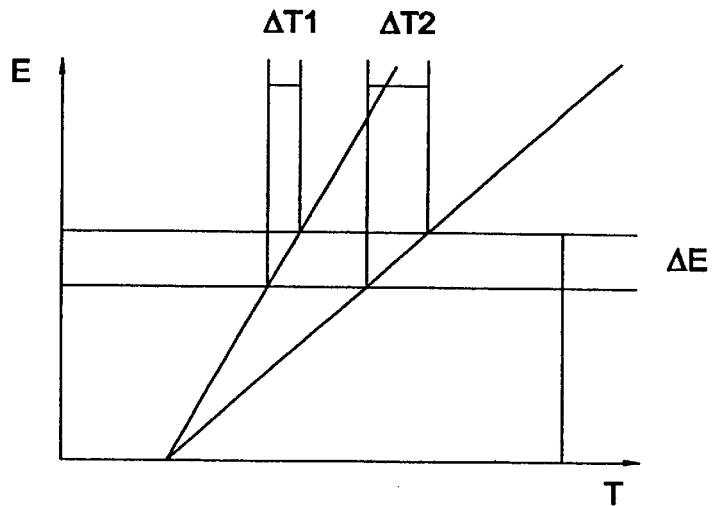
FIG. 2 illustrates a relation between timing of the V-T conversion circuit shown in FIG. 1 and a comparator level.

In the V-T conversion circuit 8, as shown in FIG. 2, when the time constant of the integration circuit 83 is increased, and the hold time is made longer, the time-range $\Delta T$ is increased with respect to the same change $\Delta E$ in angular velocity voltage (e.g., from $\Delta T1$ to $\Delta T2$, so that the resolution or sensitivity is increased. Accordingly, by optionally setting the time from timing for sample-and-holding to the timing for the next sample-and-holding, the time-range can be arbitrarily increased.

In this case, it is possible that the hold time exceeds one period of the vibration of the vibrator 1. This means that the conventional gyroscope in which a synchronous detection, an integration and a DC amplification are carried out detects an angular velocity with an amplification at an operational voltage level, while the gyroscope of this embodiment, detects an angular velocity with the extension at a time-axial level. Accordingly, it is possible obtain to an infinite amplification degree theoretically.

When the time-range is extended as described above, L–R signals in the time-range may be eliminated. The drive frequency of the bimorph vibrator is in the range of several kHz to 100 kHz. In camera-shake or a car navigation system, it is practically sufficient to detect the angular velocity signal at most 50 kHz. This means the time-range can be extended to be at least 1000 times in this embodiment.

FIG. 5 is a block diagram of another embodiment of the present invention. In the above-described example shown in FIG. 1, the reference signal is converted into a rectangular wave and software processed in the microcomputer 7, so that the timing pulse for sample-and-hold is generated. In the example shown in FIG. 5, the reference signal, which is an output from the adding circuit 2, is supplied to a timing signal generation circuit 9. A timing pulse for sample-and-hold is generated by the hardware configuration, and is supplied to the sample-and-hold circuit 81. That is, with the timing signal generation circuit 9, the software processing in the microcomputer 7 shown in FIG. 1 is carried out by use of the hardware configuration. The timing signal generation circuit 9 comprises a detection circuit for detecting the leading and trailing edges of the reference signal, a counter for counting with reference clock pulses during the time ranging from the leading edge to the trailing edge, and a logical circuit for outputting the timing signal, based on a count obtained in the counter.

A digital output from the comparator 83 may be input to the microcomputer 7 and software processed similarly to the case of FIG. 1. Otherwise, the digital signal may be counted in the hardware circuit, so that an angular velocity signal is output.

FIG. 6 is a circuit diagram of a sample-and-hold circuit for use in yet another embodiment of the present invention. In the embodiments shown in FIGS. 1 and 5, in the V-T conversion circuit 8, the sample-and-hold circuit 81 carries out sample-and-hold, and the sampled voltage is integrated in the integration circuit 82. In this embodiment, the integration circuit is made unnecessary by utilization of the drooping characteristic of the sample-and-hold circuit.

To this end, the sample-and-hold circuit 81 shown in FIG. 6 comprises an input buffer BA1, an output buffer BA2, transistors TR1 and TR2, and FET1, a resistor R1, and a capacitor C. When a timing pulse is supplied from the microcomputer 7, the transistors TR1 and TR2, and FET1 conduct sequentially, so that a signal input via the input buffer BA1 is stored in the capacitor C. The charge voltage of the capacitor C is leaked via the resistor R1 connected between the source and the gate of the FET.

The sample-and-hold circuit 81 is different from in conventional sample-and-hold circuit in that the resistor R1 is connected between the source and the gate of the FET. In the conventional sample-and-hold circuit leak current i from the capacitor C is expressed by the expressed by the following equation.

$$\Delta V/\Delta T = i(\text{leak})/C$$

On the other hand, by providing the resistor R1, it is possible to adjust the sensitivity-amplification degree and a linear slope characteristic similar to that obtained by the integration in the integration circuit can be rendered, owing to the drooping characteristic. As the resistance of the resistor R1 is increased, the slope is gentler. In this case, it is necessary to make wider the timing pulse intervals for sample-and-hold.

FIGS. 7 and 8 show the sample-and-hold signal, caused by the sample-and-hold circuit shown in FIG. 6, and the drooping characteristic. By comparing the sample-hold output signal (o) shown in FIG. 7 with the reference signal level of the comparator 83 shown in FIG. 1, the digital signal (1) which is an output from the comparator can be output.

FIG. 8 is a wave-form chart obtained when the vibrator 1 is rotated so that the Coriolis force applied to the vibrator 1 changes. The change in the degree of the Coriolis force causes the sample-and-hold output (o) to fluctuate to follow up the change, and the digital output (1) from the comparator is changed. In FIG. 8, the trailing edge of the digital output signal (1) from the comparator fluctuates between the position 11 and 12, which means the changes of time range indicating the angular velocity.

FIG. 9A is a block diagram of an angular velocity detection circuit according to another embodiment of the present invention. In the embodiment shown in FIG. 9, the differential signal from the differential amplification circuit 3 is sampled and held at two different phases, so that the null differential voltage is calculated based on the two sample-and-hold values in the microcomputer 7. After the calculated null differential voltage is D/A converted in the microcomputer 7, the obtained analog null differential voltage is input to the comparator 83. By setting the reference signal of the comparator 83 at the calculated null differential voltage, the detected angular velocity is free from the affect of the null differential voltage at real time.

FIG. 10 is wave-form charts showing the sample-and-hold points. As shown in FIG. 10, The first sample-and-hold timing F1 is adjusted at a point which is shifted by 90° from the reference signal. According to the embodiment hereinbefore, the second and successive sample-and-hold timings F2 and so on are adjusted at the same phase of the timing F1, but the different second sample-and-hold timings F2' is used in this embodiment. More specifically, the second sample-and-hold timings F2' is shifted further by 90° from the reference signal.

The null differential voltage fluctuates in response to the change in the ambient temperature. This usually causes deviation of the detected angular velocity in the conventional vibrating gyroscope. According to the this embodiment, it is possible to monitor the actual null differential voltage.

F1 and F2' of FIG. 10 can be expressed by the following formula:

$$F1 = A\{(\sin wt + a) + (B \sin wt)\}$$

$$F2' = A(\cos wt + a)$$

where reference character A represents the amplitude of the L–R differential signal, and is expressed by the following formula, when the Coriolis force is zero.

$$F1^2 + F2'^2 = A^2$$

By calculating the above formula, the amplitude A of the differential signal and the phase α can be known. Based on these values, the null differential voltage can be known, and the null differential voltage is then D/A converted. These calculation and conversion are performed in the microcomputer 7. By adjusting the reference level of the comparator 83 at the calculated null differential voltage, the output signal from the comparator is compensated at real time so that the digital signal representing angular velocity includes no null differential voltage.

According to the embodiment, it is possible to discriminate the null voltage and the rotation changing at a constant angular velocity which the conventional technique cannot discriminate.

Although in the angular velocity detection circuit shown in FIG. 9A, the null differential voltage calculated at a real time is used to adjust the comparing level in the comparator 83, the null differential voltage calculated at a real time may be used to offset the differential signal from the differential amplification circuit 3. FIG. 9B shows a block diagram of an angular velocity detection circuit according to a variation to perform such an operation. The angular velocity detection circuit shown in FIG. 9B comprises an offset adjusting circuit 10. The offset adjusting circuit receives the differential signal from the differential amplification circuit 3 and the null deferential voltage calculated at a real time from the microcomputer 7 and outputs the subtract signal between them to the sample-and-hold circuit. Thus, the signal to be sampled and hold excludes the null differential voltage, thereby detecting precise angular velocity at real time. The embodiments of FIGS. 9A and 9B may be applied to the embodiment of FIG. 5.

In the above-described embodiments, description is made on the case in which the present invention is applied to the bimorph vibrator. The present invention is not limited to the bimorph vibrator, and may be applied to any of the piezoelectric vibrating gyroscopes which output an L/R signal and in which a reference signal, an excitation voltage, and a sum voltage can be produced, such as vibrators each produced by bonding an piezoelectric element to a metallic rectangular or triangular column, and tuning fork type vibrators containing a columnar piezoelectric element.

It should be understood that the embodiments disclosed here are illustrative not restrictive in any point thereof. The scope of the present invention is defined by the appended claims rather than by the description preceding above them, and all changes that fall within meets and bounds of the claims, or equivalence of such meets and bounds are therefore intended to be embraced by the claims.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A method of detecting an angular velocity, which comprises:

generating a differential signal from a vibrator, the differential signal having a Coriolis force proportional to angular velocity if the vibrator is rotated;

generating a timing signal based on the differential signal; and applying the differential signal to a voltage-time converter which, based on the timing signal, converts the differential signal to a pulse train having a duty cycle proportional to the angular velocity.

2. A method of detecting an angular velocity, which comprises:
generating a differential signal from a difference between first and second outputs of a vibrator, the differential signal having a Coriolis force proportional to angular velocity if the vibrator is rotated, and having a null value;
generating a reference signal from a sum of the first and second output signals of the vibrator;
generating a timing signal based on the reference signal;
sample-and-holding the differential signal at times based on the timing signal to generate a sample-and-hold signal;
integrating the sample-and-hold signal;
comparing the integrated sample-and-hold signal with a predetermined level to generate a digital signal having a duty cycle proportional to the angular velocity; and
determining the angular velocity from the duty cycle of the digital signal.

3. A method of detecting an angular velocity, as claimed in claim 2, wherein the predetermined level is such that when there is no Coriolis force the duty cycle is 50%.

4. A method of detecting angular velocity as claimed in claim 3, further comprising:
comparing a first value of the sample-and-hold signal at a particular phase point in a first sampling period to a second value of the sample-and-hold signal in another sampling period at a phase point different from the phase point in the first sampling period;
estimating the null value of the differential signal output from the vibrator based upon the comparison of the first and second values of the sample-and-hold signal; and
controlling the predetermined level based on the estimated null value of the differential signal.

5. A method of detecting angular velocity as claimed in claim 3, wherein the null value is subtracted from the differential signal prior to sampling-and-holding the differential signal.

6. A method of detecting angular velocity as claimed in claim 3, wherein the time period of integration of the sample-and-hold signal is determined in accordance with a desired resolution.

7. A method of detecting angular velocity as claimed in claim 3, wherein the sample-and-hold signal is integrated over a time period corresponding to a period of the reference signal.

8. A method of detecting angular velocity as claimed in claim 3, wherein the sample-and-hold signal is integrated over a period of time greater than a period of the reference signal.

9. A method of detecting angular velocity as claimed in claim 3, wherein the sample-and-holding of the differential signal occurs at times when the value of the Coriolis force component is substantially at the maximum value thereof.

10. An angular velocity detector, which comprises:
a vibrator for generating a differential signal, the differential signal having a Coriolis force proportional to angular velocity if the vibrator is rotated;
a differential circuit for detecting the differential signal;
a timing circuit for generating a timing signal based on the differential signal detected by the differential circuit; and
a voltage-time converter for receiving the differential signal detected by the differential signal detected by the differential circuit and which, based on the timing signal, converts the differential signal to a pulse train having a duty cycle proportional to the angular velocity.

11. An angular velocity detector, which comprises:
a vibrator for generating a differential signal from a difference between first and second outputs of the vibrator, the differential signal having a Coriolis force proportional to angular velocity if the vibrator is rotated and having a null value;
a differential circuit for detecting the differential signal;
a reference signal generator for generating a reference signal from a sum of the first and second outputs of the vibrator;
a timer for generating a timing signal based on the reference signal;
a sample-and-hold circuit for sampling-and-holding the differential signal detected by the differential circuit at times based on the timing signal to generate a sample-and-hold signal;
an integrator for integrating the sample-and-hold signal;
a comparator for comparing the integrated sample-and-hold signal with a predetermined level to generate a digital signal having a duty cycle proportional to the angular velocity; and
means for determining the angular velocity from the duty cycle of the digital signal.

12. An angular velocity detector as claimed in claim 11, wherein the predetermined level is such that when there is no Coriolis force the duty cycle is 50%.

13. An angular velocity detector as claimed in claim 12, further including determining means for determining the predetermined level, which determining means comprises:
means for comparing a first value of the sample-and-hold signal at a particular phase point in a first sampling period to a second value of the sample-and-hold signal in another sampling period at a phase point different from the phase point in the first sampling period;
means for estimating the null value of the differential signal detected by the differential circuit based upon the comparison of the first and second values of the sample-and-hold signal; and
means for controlling the predetermined level based on the estimated null value of the differential signal detected by the differential circuit.

14. An angular velocity detector as claimed in claim 12 further comprising:
means for subtracting the null value from the differential signal detected by the differential circuit prior to sampling-and-holding the differential signal.

15. An angular velocity detector as claimed in claim 12, wherein the integrator integrates the sample-and-hold signal over a time period determined in accordance with a desired resolution.

16. An angular velocity detector as claimed in claim 12, wherein the integrator integrates the sample-and-hold signal over a time period corresponding to a period of the reference signal.

17. An angular velocity detector as claimed in claim 12, wherein the integrator integrates the sample-and-hold signal over a time period greater than a period of the reference signal.

18. An angular velocity detector as claimed in claim 13, wherein the vibrator has first and second electrodes from which the first and second outputs are generated.

19. An angular velocity detector as claimed in claim 18, wherein the reference signal generator comprises an adder for adding the first and second outputs.

20. An angular velocity detector as claimed in claim 13, wherein the sample-and-hold circuit provides a linear decreasing output over time.

21. An angular velocity detector as claimed in claim 13, wherein the sample-and-hold circuit samples-and-holds the differential signal detected by the differential circuit at times when the value of the Coriolis force component is substantially at the maximum value thereof.

22. An angular velocity detection circuit, which comprises:

a differential circuit for generating a differential signal having a Coriolis force proportional to angular velocity;

a timing circuit for generating a timing signal based on the differential signal detected by the differential circuit; and a voltage-time converter for receiving the differential signal from the differential circuit and which, based on the timing signal, converts the differential signal to a pulse train having a duty cycle proportional to the angular velocity.

23. An angular velocity detection circuit, which comprises:

a differential circuit for generating a differential signal from first and second input signals, the differential signal having a Coriolis force proportional to angular velocity and having a null value;

a reference signal generator for generating a reference signal from a sum of the first and second input signals;

a timer for generating a timing signal based on the reference signal;

a sample-and-hold circuit for sampling-and-holding the differential signal generated by the differential circuit at times based on the timing signal to generate a sample-and-hold signal;

an integrator for integrating the sample-and-hold signal;

a comparator for comparing the integrated sample-and-hold signal with a predetermined level to generate a digital signal having a duty cycle proportional to the angular velocity; and means for determining the angular velocity from the duty cycle of the digital signal.

24. An angular velocity detection circuit as claimed in claim 23, wherein the predetermined level is such that when there is no Coriolis force the duty cycle is 50%.

25. An angular velocity detection circuit as claimed in claim 24, further including determining means for determining the predetermined level, which determining means comprises:

means for comparing a first value of the sample-and-hold signal at a particular phase point in a first sampling period to a second value of the sample-and-hold signal in another sampling period at a phase point different from the phase point in the first sampling period;

means for estimating the null value of the differential signal detected by the differential circuit based upon the comparison of the first and second values of the sample-and-hold signal; and means for controlling the predetermined level based on the estimated null value of the differential signal detected by the differential circuit.

26. An angular velocity detection circuit as claimed in claim 24 further comprising:

means for subtracting the null value from the differential signal detected by the differential circuit prior to sampling-and-holding the differential signal.

27. An angular velocity detection circuit as claimed in claim 24, wherein the integrator integrates the sample-and-hold signal over a time period determined in accordance with a desired resolution.

28. An angular velocity detection circuit as claimed in claim 24, wherein the integrator integrates the sample-and-hold signal over a time period corresponding to a period of the reference signal.

29. An angular velocity detection circuit as claimed in claim 24, wherein the integrator integrates the sample-and-hold signal over a time period greater than a period of the reference signal.

30. An angular velocity detection circuit as claimed in claim 24, wherein the reference signal generator comprises an adder for adding the first and second input signals.

31. An angular velocity detection circuit as claimed in claim 24, wherein the sample-and-hold circuit provides a linear decreasing output over time.

32. An angular velocity detection circuit as claimed in claim 24, wherein the sample-and-hold circuit samples-and-holds the differential signal detected by the differential circuit at times when the value of the Coriolis force component is substantially at the maximum value thereof.

* * * * *